(12) United States Patent
Lee

(10) Patent No.: US 10,992,668 B2
(45) Date of Patent: Apr. 27, 2021

(54) THREE-WAY AUTHENTICATION APPARATUS AND METHOD IN CLOUD ENVIRONMENT AND 3D PRINTING APPARATUS AND METHOD USING THREE-WAY AUTHENTICATION IN CLOUD ENVIRONMENT

(71) Applicant: ELECTRONICS AND TELECOMMUNICATIONS RESEARCH INSTITUTE, Daejeon (KR)

(72) Inventor: Seung-Wook Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/694,996

(22) Filed: Nov. 25, 2019

(65) Prior Publication Data

US 2020/0169553 A1 May 28, 2020

Related U.S. Application Data

(62) Division of application No. 15/331,477, filed on Oct. 21, 2016, now Pat. No. 10,536,455.

(30) Foreign Application Priority Data

Oct. 30, 2015 (KR) .................. 10-2015-0152250
Oct. 30, 2015 (KR) .................. 10-2015-0152251
(Continued)

(51) Int. Cl.
*H04L 29/06* (2006.01)
*B33Y 50/02* (2015.01)
(Continued)

(52) U.S. Cl.
CPC .......... *H04L 63/0869* (2013.01); *B33Y 10/00* (2014.12); *B33Y 50/02* (2014.12);
(Continued)

(58) Field of Classification Search
CPC ............ G06F 2212/3035; G06F 21/44; G06F 41/445; H04L 29/06816; H04L 63/0869;
(Continued)

(56) References Cited

U.S. PATENT DOCUMENTS

2009/0157478 A1 6/2009 Yang et al.
2012/0147420 A1 6/2012 Nishimi et al.
(Continued)

FOREIGN PATENT DOCUMENTS

KR    1020110092516 A    8/2011

OTHER PUBLICATIONS

Sullivan, Intro to OMA GotAPI, Jul. 29, 2015, AT & T, pp. 1-12.*
(Continued)

*Primary Examiner* — Roderick Tolentino
*Assistant Examiner* — Jenise E Jackson

(57) ABSTRACT

Disclosed herein are a three-way authentication apparatus and method in a cloud environment. The three-way authentication method in a cloud environment includes performing, by a control device and a service device, mutual authentication through an IF-1 interface, performing, by the control device and a function server, mutual authentication through an IF-2 interface, requesting, by the control device, the function server to issue an authentication token for authentication between the service device and the function server, and delivering an authentication token issued by the function server to the service device, and performing, by the service device, mutual authentication with the function server using the delivered authentication token through an IF-3 interface.

3 Claims, 6 Drawing Sheets

(30) Foreign Application Priority Data

Sep. 30, 2016 (KR) .................. 10-2016-0126110
Sep. 30, 2016 (KR) .................. 10-2016-0126112

(51) Int. Cl.
*B33Y 10/00* (2015.01)
*H04W 12/06* (2021.01)
*H04W 12/069* (2021.01)

(52) U.S. Cl.
CPC ....... *H04L 63/0807* (2013.01); *H04W 12/068* (2021.01); *H04W 12/069* (2021.01); *G05B 2219/49023* (2013.01)

(58) Field of Classification Search
CPC ............. H04L 9/3213; H04L 63/0807; H04W 12/068; H04W 12/069
USPC ............................................ 726/5
See application file for complete search history.

(56) References Cited

U.S. PATENT DOCUMENTS

2014/0310640 A1 10/2014 Kim et al.
2016/0167305 A1* 6/2016 Pak .................. G06F 30/00
700/98

OTHER PUBLICATIONS

Hata et al, NT DOCOMO, OMA GotAPI, May 2015, pp. 1-40.*
Figueroa et al, From Sense to Print: Towards Automatic 3D Printing From 3D Sensing Devices, Oct. 16, 2013, IEEE, p. 4897-4904.*
Yuqing et al, SmartPrint: A Cloud Print System for Office, Dec. 13, 2013, IEEE, pp. 95-100.*

* cited by examiner

THREE-WAY AUTHENTICATION APPARATUS AND METHOD IN CLOUD ENVIRONMENT AND 3D PRINTING APPARATUS AND METHOD USING THREE-WAY AUTHENTICATION IN CLOUD ENVIRONMENT

CROSS REFERENCE TO RELATED APPLICATIONS

This application is a divisional application of U.S. patent application Ser. No. 15/331,477, filed Oct. 21, 2016 and claims the benefit of Korean Patent Application Nos. 10-2015-0152250, filed Oct. 30, 2015, 10-2015-0152251, filed Oct. 30, 2015, 10-2016-0126110, filed Sep. 30, 2016, and 10-2016-0126112, filed Sep. 30, 2016, which are hereby incorporated by reference in their entirety into this application.

BACKGROUND OF THE INVENTION

1. Technical Field

The present invention relates to an authentication apparatus and method that implement a service performed such that a specific device present at a physical location is bound with a cloud service on the Internet.

2. Description of the Related Art

Most existing services have been chiefly implemented in an environment in which a single user terminal accesses a single Internet service and uses the service in a client-server configuration. However, with the advancement of cloud services and the Internet of Things (IoT) and the development of various service devices such as a three-dimensional (3D) printer, there is required technology that enables various devices to be used in conjunction with a cloud server connected to the Internet using mobile user terminals such as smart phones, without spatial restrictions.

For example, there are presented methods for authenticating a smart phone-3D printer-function server configuration so that the downloading and modeling of content for performing 3D printing may be implemented using a function server (a cloud service server) and control commands may be issued using a mobile device such as a smart phone.

When 3D printing is performed using current technology, the following problems may arise.

First, 3D printing is a task that requires a procedure for downloading content for 3D printing from a content server, performing modeling for 3D printing, and then performing actual 3D printing, and a user must stay near a 3D printer for a long period of time or must periodically visit the place where 3D printing is performed.

Next, a problem that may occur during the performance of 3D printing (e.g. exceptional situations such as the exhaustion of raw materials or the occurrence of mechanical defects in printing) cannot be recognized when the user is not present in the corresponding place.

Further, when a 3D printer is controlled using a smart phone, the downloading of content and the control of the 3D printer must be performed via the smart phone, meaning that the downloading and modeling of large-capacity 3D content must be processed, thus resulting in high wireless network communication expenses and limiting the scale of 3D printing due to the functionality of the smart phone.

Therefore, a kind of service is required in which control is performed via a smart phone and which is provided such that a cloud server and a 3D printer are operated in conjunction with each other. For this service, a method for performing three-way authentication for a smart phone-3D printer-cloud server configuration is required.

From the standpoint of standards, a Generic Open Terminal Application Program Interface (GotAPI) of Open Mobile Alliance (OMA) and Device Web API (DWAPI) standards have been developed, but technology related to such a three-way authentication method has not been clearly presented.

SUMMARY OF THE INVENTION

Accordingly, the present invention has been made keeping in mind the above problems occurring in the prior art, and an object of the present invention is to provide a three-way authentication apparatus and method in a cloud environment, which provides a service in which the control of service is processed via a control device such as a mobile terminal and in which the performance of an actual service is processed via interoperation between an external function server and a service device.

Another object of the present invention is to provide a 3D printing method in a cloud environment using three-way authentication.

In accordance with an aspect of the present invention to accomplish the above objects, there is provided a three-way authentication method in a cloud environment, including performing, by a control device and a service device, mutual authentication through an IF-1 interface, performing, by the control device and a function server, mutual authentication through an IF-2 interface, requesting, by the control device, the function server to issue an authentication token for authentication between the service device and the function server, and delivering an authentication token issued by the function server to the service device, and performing, by the service device, mutual authentication with the function server using the delivered authentication token through an IF-3 interface.

In accordance with another aspect of the present invention to accomplish the above objects, there is provided a user terminal device, including an application (App), a plug-in connected to an external device, a Generic Open Terminal Application Program Interface (GotAPI) authentication server for performing authentication between the App and the plug-in, and a GotAPI server for delivering a control signal from the App to the plug-in, wherein the plug-in is connected to an external device through a Device Web API-1 (DWAPI-1) interface, and wherein the plug-in is connected to an external service server that supports the external device through a DWAPI-2 interface.

In accordance with a further aspect of the present invention to accomplish the above objects, there is provided a three-dimensional (3D) printing method using three-way authentication in a cloud environment, including performing, by a user terminal, service discovery for a 3D printer and acquisition of information of the 3D printer through a DWAPI-1 interface, accessing, by the user terminal, a content server, which provides a cloud service, through a DWAPI-2 interface, and then acquiring file data that is capable of being 3D printed, and controlling, by the user terminal, the 3D printer such that the 3D printer accesses the content server through a DWAPI-3 interface and downloads and prints a 3D printing reconstruction file.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings and preferred embodiments so that the present invention can be easily understood and practiced by those skilled in the art.

Repeated descriptions and descriptions of known functions and configurations which have been deemed to make the gist of the present invention unnecessarily obscure will be omitted below.

The terms used in the present specification are defined in consideration of functions in the embodiments of the present invention and may be sufficiently modified depending on the intention or usage of a user or an operator, and thus the terms should be defined based on the overall description of the present specification.

Figure 1:
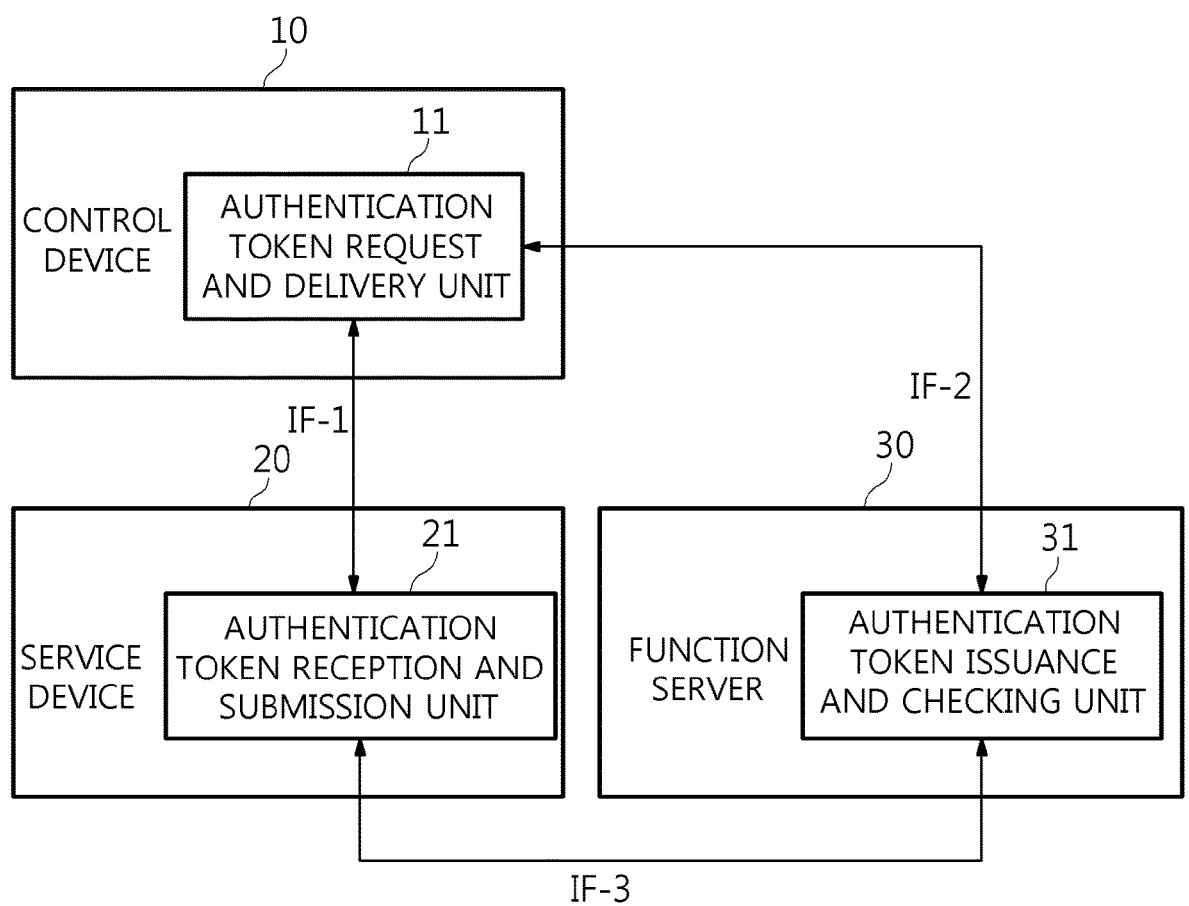
FIG. 1 is a configuration diagram of a three-way authentication system according to an embodiment of the present invention.

FIG. 1 is a configuration diagram of a three-way authentication system according to an embodiment of the present invention.

Referring to FIG. 1, the three-way authentication system includes a control device 10, a service device 20, and a function server 30. For three-way authentication, the control device 10, the service device 20 and the function server 30 include an authentication token request and delivery unit 11, an authentication token reception and submission unit 21, and an authentication token issuance and checking unit 31, respectively.

The authentication token request and delivery unit 11 performs mutual authentication with the service device 20 through an IF-1 interface. In this case, as an authentication method, a method using an application ID (AppID), a method using a signature, or a method using an ID and a Password (ID/password) may be used. Further, the authentication token request and delivery unit 11 performs mutual authentication with the function server 30 through an IF-2 interface. Here, as an authentication method, a method using AppID, a method using a signature, or a method using an ID/Password may be used in the same way as that of the IF-1 interface. Furthermore, the authentication token request and delivery unit 11 requests the authentication token issuance and checking unit 31 to issue an authentication token, which enables the service device 20 to obtain authentication from the function server 30 through an authenticated channel. When the authentication token issuance and checking unit 31 issues an authentication token and delivers it to the authentication token request and delivery unit 11, the authentication token request and delivery unit 11 delivers the authentication token to the authentication token reception and submission unit 21 of the service device 20 through a secure authenticated channel between the control device 10 and the service device 20.

The authentication token reception and submission unit 21 requests authentication from the function server 30 using the received authentication token through an IF-3 interface, and the authentication token issuance and checking unit 31 of the function server 30 checks the authentication token and then authenticates the service device 20.

The present invention implements the above-described three-way authentication method by which the configuration including the control device-service device-function server is authenticated. That is, the three-way authentication method in a cloud environment includes the step of performing, by the control device and the service device, mutual authentication through the IF-1 interface, the step of performing, by the control device and the function server, mutual authentication through the IF-2 interface, the step of requesting, by the control device, the function server to issue an authentication token for authentication between the service device and the function server and delivering the authentication token issued by the function server to the service device, and the step of performing, by the service device, mutual authentication with the function server using the received authentication token through the IF-3 interface.

Meanwhile, the Device Web API (DWAPI) defined in international standards such as existing Open Mobile Alliance (OMA) has been chiefly applied to health-care sensors and devices directly connected to user terminals such as smart phones. Such health-care sensors and devices are directly connected to smart phones and are then constantly used, and the status of the smart phones may be directly checked.

Figure 2:
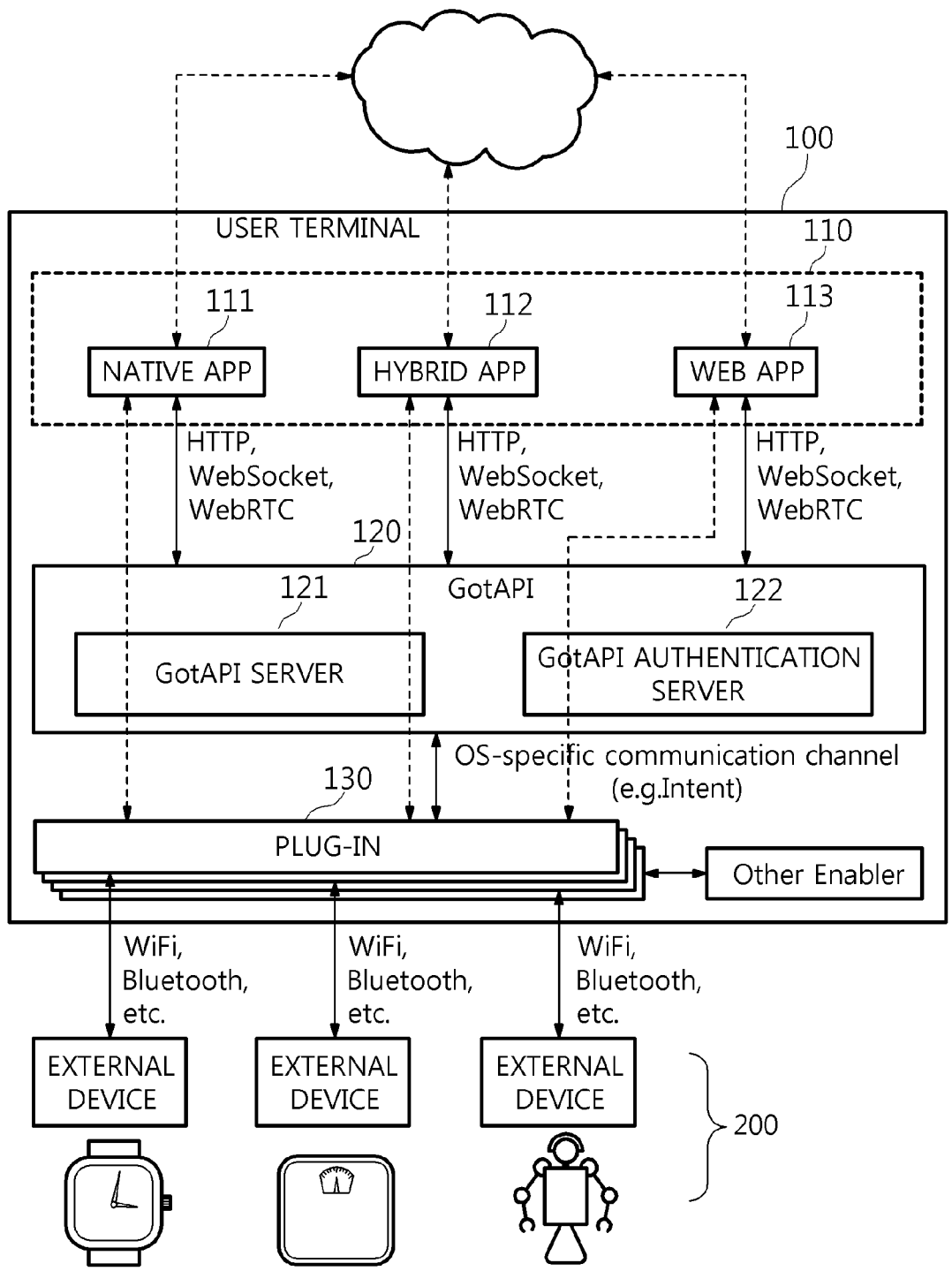
FIG. 2 is a diagram showing the architecture of a typical OMA Generic Open Terminal Application Program Interface (GotAPI)

FIG. 2 is a diagram showing the architecture of an OMA GotAPI.

Referring to FIG. 2, the GotAPI desirably reflects the architecture of a DWAPI. That is, a GotAPI 120 supports an application (App) 110 including a native App 111, a hybrid App 112, and a web App 113, and is connected to the App 110 via Hypertext Transfer Protocol (HTTP), WebSocket, or Web Real-Time Communication (WebRTC).

Further, the GotAPI 120 performs authentication between the App 110 and a plug-in 130 through a GotAPI authentication server (Auth Server) 122 and transfers the control of the App 110 to the plug-in 130 through a GotAPI server 121.

The plug-in 130 is connected to an external device 200, including a smart device, a health-care device and a remote plaything, through WiFi or Bluetooth and then executes a function.

However, in order to use a 3D printer as the external device 200, three-way mutual authentication between a smart phone, a 3D printer and an external service server must be performed because the 3D printer may not always be located near the smart phone and the control of the 3D printer must be remotely performed, and for this function, a cloud service must be able to be used in conjunction with the 3D printer.

Figure 3:
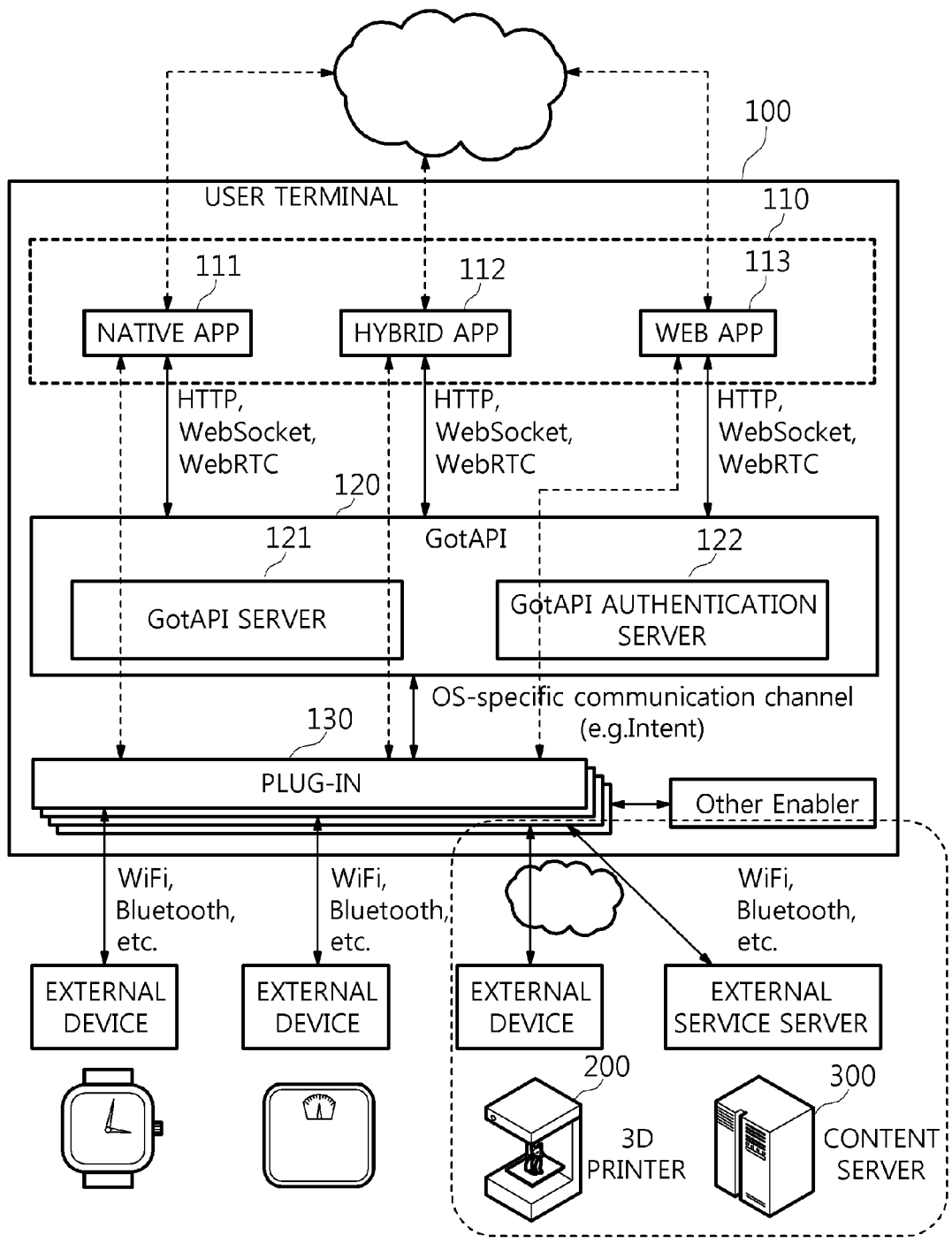
FIG. 3 is a diagram showing the architecture of an OMA GotAPI according to an embodiment of the present invention.

Therefore, to meet these requirements, the architecture of FIG. 2 must be extended in the form of FIG. 3 according to the present invention.

FIG. 3 is a diagram showing the structure of an OMA Generic Open Terminal API (GotAPI) according to an embodiment of the present invention.

Referring to FIG. 3, an extension plug-in 130 may be connected to a 3D printer 200 or an external service server such as a content server 300 that supports 3D printing through WiFi, Bluetooth or Internet.

Figure 4:
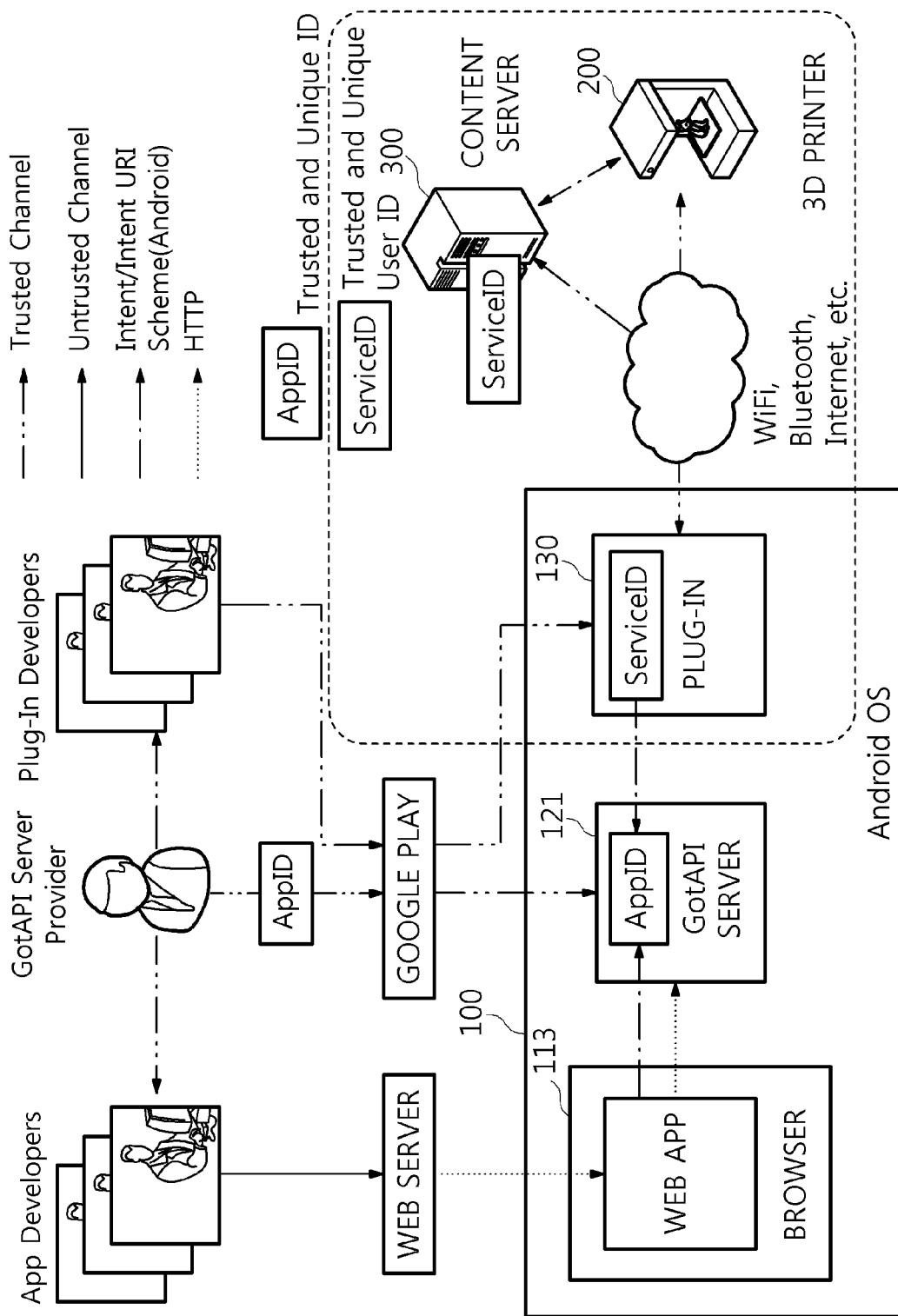
FIG. 4 is a diagram showing the service flow of 3D printing in the architecture shown in FIG. 3.

FIG. 4 is a diagram showing the service flow of 3D printing in the architecture of

FIG. 3.

Referring to FIG. 4, a user accesses the content server 300, which is a cloud service server, through the plug-in 130, selects content, requests the content server 300 to perform a 3D printing reconstruction modeling task for 3D content, and accesses the 3D printer 200 to control the 3D printer 200 so that a 3D printing reconstruction file is downloaded and printed, thus enabling 3D printing to be performed from a remote place through a cloud service.

Figure 5:
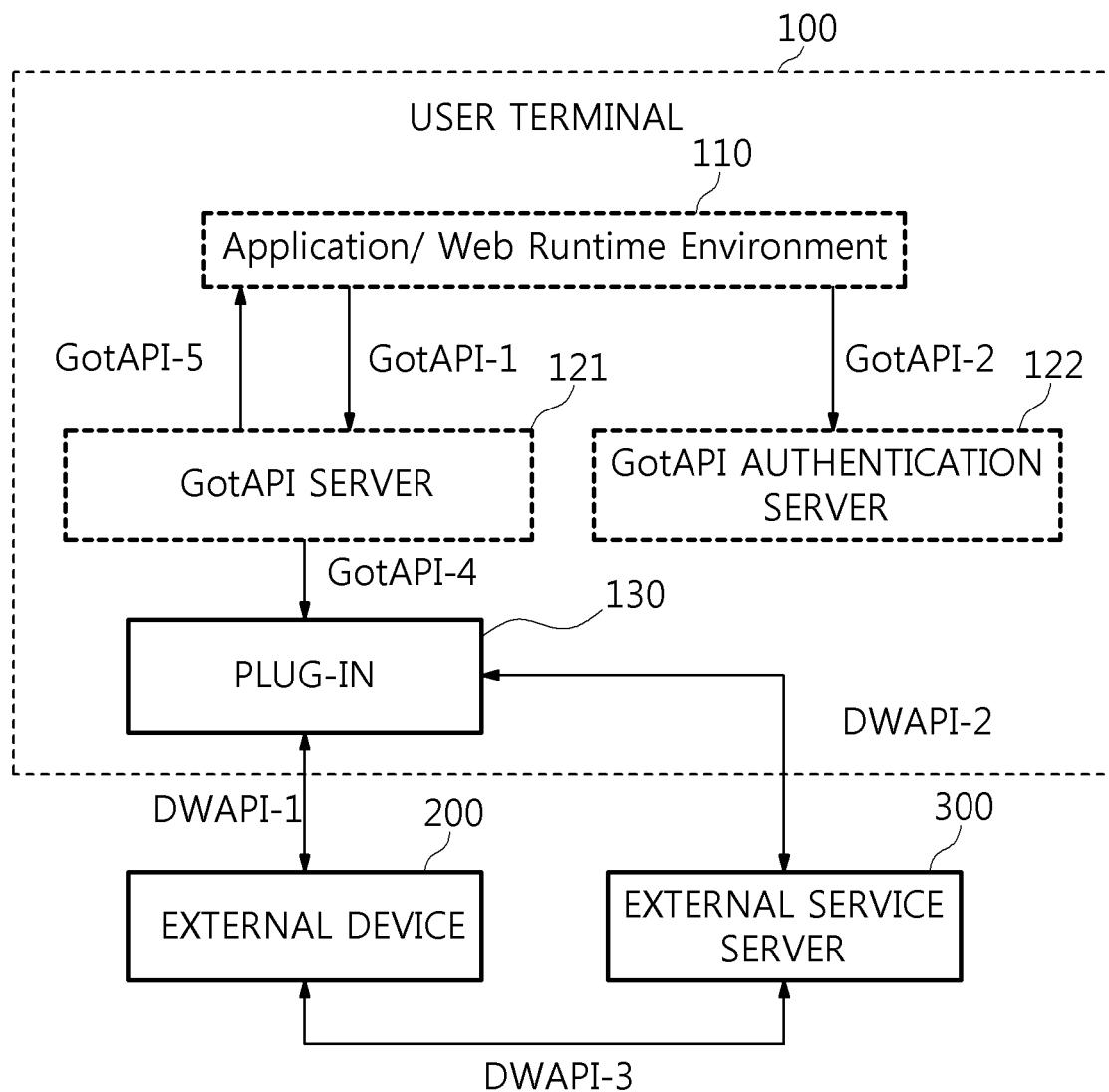
FIG. 5 is a diagram showing the extension of the architecture presented by OMA GotAPI.

FIG. 5 is a diagram showing the extension of the architecture presented by OMA GotAPI.

Referring to FIG. 5, in addition to the architecture including the App 110, the GotAPI server 121, the GotAPI authentication server 122, and the plug-in 130, a DWAPI-2 interface functions to allow the plug-in 130 and the external service server 300 to operate in conjunction with each other, and a DWAPI-3 interface functions to allow the external device 200 and the external service server 300 to operate in conjunction with each other.

Figure 6:
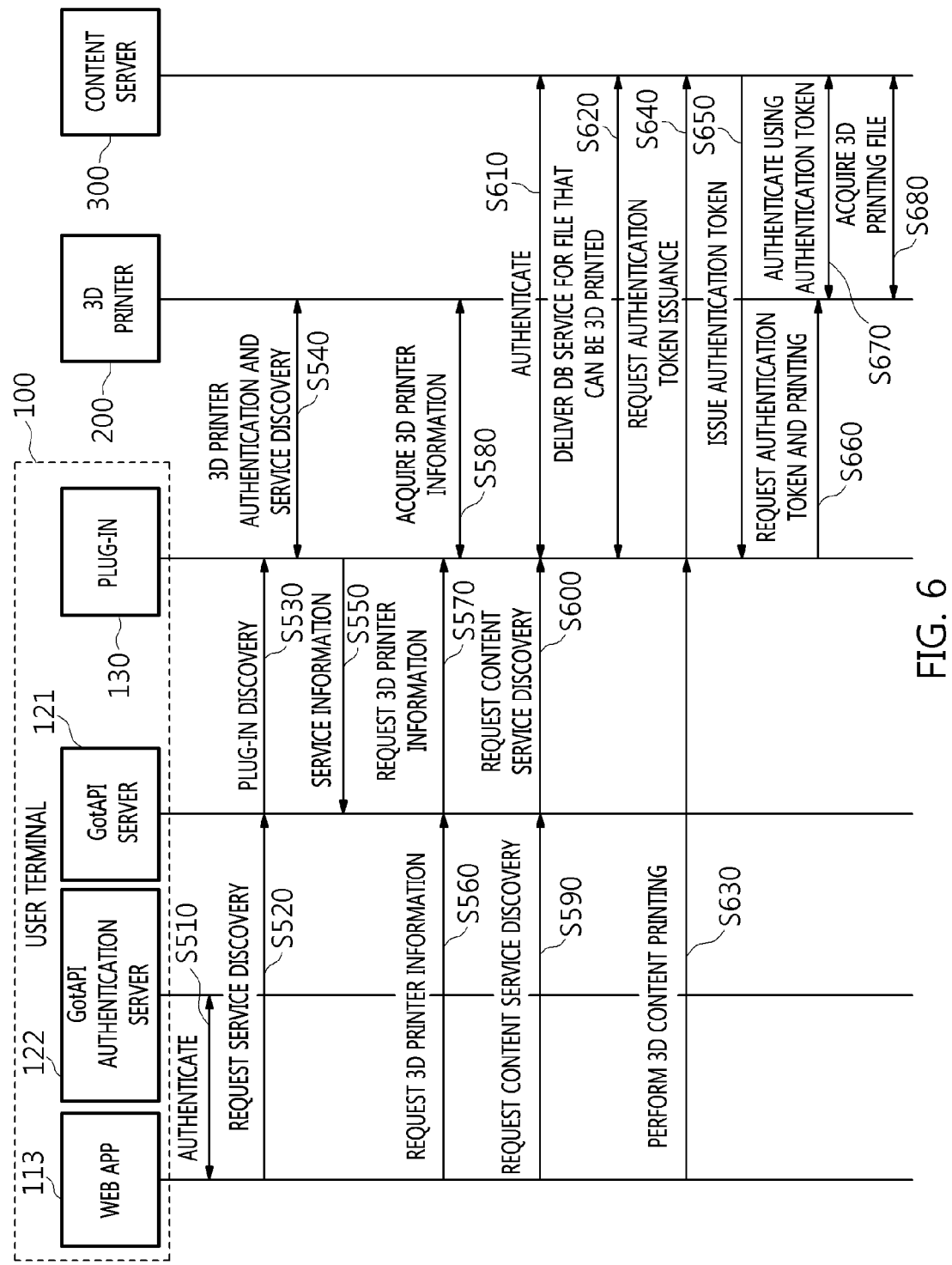
FIG. 6 is an exemplary flow diagram for explaining a 3D printing method using three-way authentication in a cloud environment according to the present invention.

FIG. 6 is a flow diagram for explaining a 3D printing method using three-way authentication in a cloud environment according to the present invention.

Referring to FIG. 6, when the web App 113 performs authentication with the GotAPI authentication server 122 at step S510, the web App 113 requests the GotAPI server 121 to discover a service (i.e. service discovery) at step S520.

Then, the GotAPI server 121 discovers a plug-in at step S530, and the plug-in 130 fetches service information from the 3D printer 200 through a DWAPI-1 interface at step S540. During this procedure, authentication between the plug-in and the 3D printer (PLN-3DP authentication) and service discovery therebetween are executed through the DWAPI-1 interface.

When the web App 113 requests information of the 3D printer 200 from the GotAPI server 121 at step S560, the GotAPI server 121 requests information of the 3D printer from the plug-in 130 at step S570, and the plug-in 130 acquires the information of the 3D printer through the DWAPI-1 interface S580.

When the web App 113 requests content service discovery through the GotAPI server 121 at steps S590 and S600, the plug-in 130 requests service discovery from an external server through a DWAPI-2 interface. In this case, although authentication between the web App and the plug-in 130 has been performed through the GotAPI authentication server 122, an authenticated relationship between the plug-in 130 and the content server 300 is not yet established, and thus authentication is performed through the DWAPI-2 interface at step S610. Here, as an authentication method, either a method using an ID/password, which is a typical method for authentication when a web service is used, or Open Authentication (OAuth), which is widely used in social services, may be used.

If authentication has been completed and an authenticated relationship between the plug-in 130 and the content server 300 has been established, the content server 300 delivers a database (DB) service for a file that can be 3D printed to the plug-in 130 at step S620, and the web App 113 performs the printing of specific 3D content through the plug-in 130 at step S630. Then, the plug-in 130 requests the content server 300 to issue an authentication token, which enables the 3D printer 200 that will be used to be connected to the content server 300, through the DWAPI-2 interface at step S640. When the content server 300 issues an authentication token to the plug-in 130 at step S650, the plug-in 130 delivers the authentication token to the 3D printer 200 through the DWAPI-1 interface at step S660. The 3D printer 200 receives the authentication token, together with a 3D printing command, from the plug-in 130, and forwards the authentication token to the content server 300 through a DWAPI-3 interface, which is the interface between the 3D printer 200 and the content server 300, thus obtaining authentication from the content server 300 at step S670. Thereafter, in response to the printing command received from the DWAPI-2 interface, the 3D printer receives the file for 3D printing from the content server 300 through the DWAPI-3 interface and then initiates 3D printing at step S680.

Thereafter, the 3D printer 200 periodically delivers information about the current printing status to the plug-in 130 through the DWAPI-1 interface, and the plug-in 130 forwards the current printing status information to the web App through the GotAPI server, thus allowing the user of the web App to read information about 3D printing that is currently being performed.

The principal components of the above-described DWAPI-1, 2, and 3 interfaces are given in the following Tables 1 to 3.

TABLE 1

| Interface | Function |
| --- | --- |
| PLN-3DP Authentication | Perform authentication between plug-in and 3D printer |
| Service Discovery | Discover service information of 3D printer (3DP) |
| One-shot measuring | Fetch current status information of 3DP on demand |
| | Configuration information of 3DP: model name, memory, printing type, terminal characteristic information |
| | Printer operating status: normal/abnormal, temperature, amount of remaining filament, and error details |
| | Printing list: user name, task name, task start time, expected end time, task rate, preheating of print bed and nozzle, and checking of horizontality of bed |
| Asynchronous measuring | Provide notification when 3DP status information is changed |
| Service Connecting | Establish cloud service to which 3DP is to be connected Connection URL, connection service function, and 3DP-Support Vector Regression (SVR) Authentication Token |
| 3D Printing Command | Deliver 3DP printing command |
| | Deliver commands for initiation, stoppage, cancellation, and resumption of printing |

TABLE 2

| Interface | Function |
| --- | --- |
| PLN-Support Vector Clustering (SVC) Authentication | UserID/Password or OAuth |

TABLE 2-continued

| Interface | Function |
| --- | --- |
| Service Discovery | Discover service information of content server |
| One-shot measuring | Fetch current status information of content server on demand Content list and usage condition Operating status of content server: system load, memory, type of 3D printer that is supported, method for converting 3D model into G-Code, etc. |
| Asynchronous measuring | Provide notification when status of 3DP connected to content server is changed |
| Authentication Token Request | Request content server to issue authentication token to be delivered so that 3DP can be authenticated |
| 3D G-Code Option Setting | Set option values for converting 3D model into G-Code Quality: layer height (mm), surface layer thickness (mm), and retraction Filling: upper/lower surface thickness (mm), filling density (%), and filling pattern Printing speed and temperature: printing speed, nozzle temperature, and bed temperature Support form: none/part/all Bottom surface type: strong/medium/ weak adhesion Filament: diameter, injection flow |

TABLE 3

| Interface | Function |
| --- | --- |
| 3DP-SVC Authentication | Perform authentication using authentication token |
| Content Request | Request 3D printing content |
| Content Download | Download G-code/3D model for 3D printing |

From the standpoint of marketability of the present invention (the possibility of commercialization and the scale of markets), provided is a service that enables a 3D printer to be used via a mobile device in the current technology without the spatial restrictions, in keeping with the current trend in which the use of services based on smart phones increases, so that the use of 3D printers is activated and cloud services related to the 3D printers are newly provided, thus enabling related markets to be created and preoccupied.

In accordance with the present invention, there are advantages in that a 3D printing user may safely perform 3D printing without spatial and temporal restrictions, and users in remote places may safely share and use an expensive 3D printer with each other.

Further, the present invention enables a 3D printer to be safely used without being restricted by the respective locations of the 3D printer and a user terminal due to the characteristics of 3D printing, which takes a long time.

Furthermore, the present invention separates tasks such that the selection of content and the control of printing, which require a relatively small amount of communication data, are performed by a mobile device over a mobile communication network and such that the conversion of a 3D model into G-code and the transmission of printing data, which require a relatively large amount of data to be transmitted and processed, are directly performed between the 3D printer and a cloud server, without being restricted by the limited performance of the mobile device or by high mobile network communication expenses when performing 3D printing using the mobile device, thus enabling large-capacity 3D content to be safely printed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A user terminal device, comprising:
an application (App);
a plug-in connected to an external device;
a Generic Open Terminal Application Program Interface (GotAPI) authentication server for performing authentication between the App and the plug-in; and
a GotAPI server for delivering a control signal from the App to the plug-in,
wherein the plug-in is connected to an external device through a Device Web API-1 (DWAPI-1) interface, and
wherein the plug-in is connected to an external service server that supports the external device through a DWAPI-2 interface,
wherein the external device and the external service server operate in conjunction with each other through a DWAPI-3 interface,
wherein the external device is a 3D printer and the external service server is a content server,
wherein the user terminal device controls the 3D printer such that the 3D printer accesses the content server through the DWAPI-3 interface and downloads and prints a 3D printing reconstruction file,
wherein controlling the 3D printer comprises:
  requesting, by the user terminal device, issuance of an authentication token through the DWAPI-2 interface;
  delivering, by the user terminal device, the authentication token to the 3D printer through the DWAPI-1 interface;
  obtaining, by the 3D printer, authentication from the content server by delivering the authentication token to the content server through the DWAPI-3 interface, when the authentication token, together with a 3D printing command, is received from the user terminal device;
  receiving, by the 3D printer, the 3D printing reconstruction file from the content server through the DWAPI-3 interface in response to the 3D printing command; and
  printing, by the 3D printer, the 3D printing reconstruction file.

2. The user terminal device of claim 1, wherein the App comprises at least one of a native App, a hybrid App, and a web App.

3. The user terminal device of claim 1, wherein the plug-in is connected to the external device or the external service server through at least one of WiFi, Bluetooth, and Internet.

* * * * *